May 10, 1966  C. M. ANDERSON  3,250,084
CONTROL SYSTEMS
Filed Sept. 25, 1963
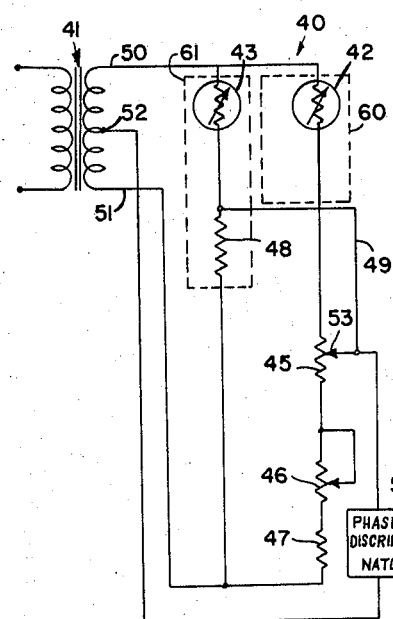
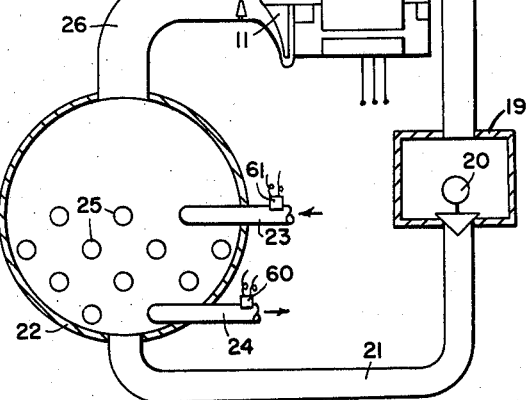
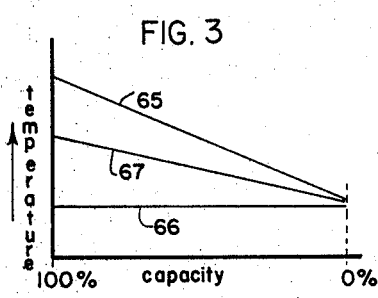
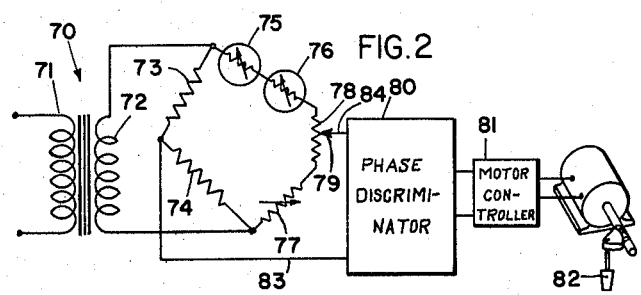
INVENTOR.
CARL M. ANDERSON.
BY Frank N. Decker Jr.
ATTORNEY.

United States Patent Office

3,250,084
Patented May 10, 1966

3,250,084
CONTROL SYSTEMS
Carl M. Anderson, Syracuse, N.Y., assignor to Carrier Corporation, Syracuse, N.Y., a corporation of Delaware
Filed Sept. 25, 1963, Ser. No. 311,419
2 Claims. (Cl. 62—212)

This invention relates to control systems, and, more particularly, it relates to an improved control system adapted for use with refrigeration equipment to provide a stable predetermined control characteristic.

Refrigeration systems of the type herein referred to may be used to chill water, air or other fluid to provide refrigeration at any desired location. Such systems are typically controlled by providing a temperature sensor to sense the temperature of water or other fluid which is either entering or leaving the refrigeration machine. A control circuit is provided which employs the information derived from the temperature sensor to increase or decrease the capacity of the refrigeration system in accordance with the load requirements and the desired temperature to be maintained.

For example, a centrifugal refrigeration system is conveniently controlled by providing adjustable inlet guide vanes or damper to throttle the flow of refrigerant to the centrifugal compressor. A temperature sensitive resistance element, such as a thermistor, may be placed in the chilled water line leaving the cooler or evaporator section of the centrifugal refrigeration system to sense the temperature of the chilled water and thus determine whether the refrigeration machine is producing sufficient cooling capacity. A control circuit is connected to the thermistor to actuate a suitable electric, hydraulic, or pneumatic motor to open or close the refrigerant throttling means so as to adjust the capacity of the refrigeration system and enable it to maintain the desired leaving chilled water temperature.

In order to lend stability to refrigeration control systems of the type described, it is desirable to provide what is known in the art as a throttling range or proportional band in the control characteristic of the system. The throttling range or proportional band inserts into the control characteristic a temperature droop so that the refrigeration machine operates to provide a slightly different temperature at one capacity than it does at another. For example, if a refrigeration machine is designed to provide a particular leaving chilled water temperature when operating at maximum capacity, the control system may be designed to have a characteristic such that the refrigeration system produces a few degrees lower temperature when operating at minimum capacity. The difference in temperature between the maximum and minimum capacity operating conditions is referred to as the throttling range or proportional band of the control.

The throttling range or proportional band provides stability to the control characteristic of the system by reducing hunting and overshooting. Consequently, if the refrigeration system is producing less than full capacity and an increase in capacity is called for by the temperature sensor, the system increases capacity but balances out at a new temperature which is slightly higher than the temperature previously maintained. There are inherent time lags between the adjusting of the capacity of the refrigeration system and the final temperature which is achieved. By balancing the system out at a new temperature which is higher than the pre-existing temperature, undesirable overcorrection of the system due to the time lag is prevented.

It will be apparent, however, that in some instances the droop in temperature introduced into the control characteristic of a refrigeration system by the throttling range or proportional band is undesirable. Elimination of the proportional band or throttling range, however, generally would give rise to instability in the control characteristic and cause hunting and overshooting due to the time lag in the response of the refrigeration system. It is well known, for example, that centrifugal compressors such as used in refrigeration systems, exhibit the undesirable property of surging at light loads. Surge is an undesirable and noisy condition of operation of the compressor wherein the refrigerant gas flow oscillates forward and backward through the compressor and results in unstable system operation. This tendency to go into surge is most prevalent at light loads when the compressor is operating at a low flow rate and high lift condition. It will be seen, therefore, that the inherent droop in the temperature of a stable control system gives rise to a tendency which may cause the compressor to go into surge at low loads. On the other hand, if the suction temperature at which the compressor operates at low loads is made to rise rather than drop, or is maintained relatively constant, the tendency to go into surge is reduced because of the inclination in lift requirements.

Another disadvantage to the inherent droop introduced by the proportional band into the control characteristic of the refrigeration system is that unnecessary power is required by the compressor to provide the lower suction temperature at a time when the refrigeration load is low and a higher suction temperature, requiring less compressor power, could be tolerated because of the light load. It would be desirable, therefore, to eliminate the droop from the system or even to provide a rising temperature characteristic at low loads in order to reduce the power input required to operate the refrigeration system under conditions of light refrigeration loads.

Still another reason for eliminating the droop in the control characteristic of the refrigeration system operating under light loads is that in some instances it may be possible to provide more effective humidity control by providing a temperature characteristic at light loads other than that which results from the inherent droop in the control system characteristic. An example of this situation would be where the inherent droop results in a temperature under low loads which tends to condense more moisture from the air than is desired. This could be prevented either by maintaining the leaving chilled water temperature constant or permitting it to slightly rise under low loads.

Accordingly, it is the principal object of this invention to provide an improved control system for a refrigeration system.

It is a further object of this invention to provide an improved method of controlling a refrigeration system.

These and other objects of this invention which will become apparent are achieved in the preferred embodiments thereof by employing a first temperature sensitive element in the leaving chilled water line, and a second temperature sensitive element in the entering chilled water line of a refrigeration system. A control system utilizing the temperature sensitive resistance elements is provided to adjust the capacity of the refrigeration system. A proportional band or throttling range is provided in the control characteristic to increase the stability of the control system. In accordance with this invention, the temperatures sensed by the two temperature sensitive elements are combined and employed in the control system so as to reduce or modify the temperature droop usually associated with a control having a proportional band thereby providing a stable control characteristic. For example, in one embodiment of this invention, the resistances of the two temperature sensitive resistance elements are added to provide a control which is a function of the mean temperature of entering and leaving chilled water wherein a temperature droop is obtained in the mean temperature while maintaining the leaving chilled water temeprature substantially constant. In another embodiment of this invention, the temperature sensitive resistance elements are connected in parallel so as to modify the temperature sensed by one of the resistance elements with the temperature sensed by the other of the resistance elements.

By utilizing a control system based on both entering and leaving chilled water temperatures, any desired control characteristic can be provided in the leaving chilled water temperature, while at the same time it is possible to maintain stability in the system by incorporating a suitable throttling range or proportional band.

These and other objects of this invention will become apparent by reference to the following specification and attached drawings wherein:

FIGURE 1 is a schematic illustration, partly in cross-section, of a centrifugal refrigeration system employing a control system in accordance with this invention;

FIGURE 2 is a schematic illustration of a modified control system; and

FIGURE 3 is a graph illustrating a temperature control characteristic which may be achieved by use of the instant invention.

Referring particularly to FIGURE 1, there is shown a schematic diagram of a centrifugal refrigeration system 10 of a type suitable for use with the present invention. It will be understood, however, that other types of refrigeration or heating systems may also be controlled by means of the type of control herein described.

Refrigeration system 10 comprises a centrifugal compressor 11 driven by a suitable rotating power source, such as electric compressor motor 12. The refrigeration system includes a condenser 13 having an inlet 14 and an outlet 15 for cooling tower water which flows through internal tubes 16 to condense refrigerant forwarded from compressor 11 through hot gas line 17 to the condenser. A liquid line 18 conveys liquid refrigerant to an accumulator 19 having a suitable valve 20 therein for metering the flow of refrigerant through liquid line 21 to an evaporator or cooler section 22.

Cooler 22 comprises a shell having a plurality of internal tubes 25 connected with an entering chilled water line 23 and a leaving chilled water line 24. Lines 23 and 24 carry a fluid heat exchange medium which is commonly water for distribution to suitably located remote heat exchangers (not shown) disposed in a region to be cooled or conditioned. Heat is carried from the external heat exchangers through entering chilled water line 23 and passed through the walls of tubes 25 where it gives up its heat to the liquid refrigerant causing the refrigerant to vaporize or boil. The thus vaporized refrigerant is passed through vapor line 26 and inlet guide vanes 27 to compressor 11 and the cycle is repeated. Thus, heat carried by the entering chilled water 23 is given up to vaporize refrigerant in cooler 22 and the water is thereby chilled. This heat is carried by the refrigerant vapor to condenser 13 and is rejected to the cooling tower water which passes through the condenser.

The capacity of the refrigeration system may be controlled by the position of inlet dampers or guide vanes 27 which throttle refrigerant flow to the compressor. When guide vanes 27 are opened to a fully open position, a maximum volume of refrigerant flows through the compressor and the refrigeration system operates at its maximum capacity. When less capacity is required of the refrigeration system, inlet guide vanes 27 are closed to a less fully open position and the capacity of the refrigeration system is correspondingly reduced. Typically, guide vanes 27 are adjusted in accordance with varying refrigeration loads imposed on the system so as to maintain the desired refrigeration system capacity. It will be understood that other means for controlling the capacity of the system may be used instead of the one shown.

Guide vanes 27 may be adjusted by any convenient hydraulic, pneumatic or electric operator. As shown in the drawing, this operator may consist of a geared shaft 28 connected to guide vanes 27 operated by a worm gear which is fixed to the end of the rotatable shaft of an electrically reversible vane operating electric motor 30.

In order to provide the desired control characteristic for the refrigeration system a suitable control circuit designated generally 40, is provided. Control circuit 40 is illustrated in the drawing in simplified schematic form in order to facilitate an understanding of the principles of this invention. It will be appreciated that the actual control circuit may be somewhat more complex and may integrate a number of variables which are desired to effect the type of control characteristic desired for the refrigeration system. For example, control circuit 40 may be of the type illustrated in copending application Serial No. 311,455, filed September 25, 1963, now Patent No. 3,204,423, granted September 7, 1965, in the name of Roy E. Resh, Jr., entitled, "Control Systems," which is assigned to the assignee of the present application, and to which reference is made for a more complete description of an embodiment of a control circuit of the type herein illustrated.

Control circuit 40 comprises a power transformer 41 having its primary winding connected to a suitable source of alternating current and having its secondary winding connected by means of coductors 50 and 51 to a suitable bridge circuit. A first leg of the bridge circuit comprises a temperature sensitive resistance element 43 in parallel with a second temperature sensitive resistance element 42 and a portion of position feedback potentiometer 45. A second leg of the bridge circuit comprises the remaining portion of potentiometer 45 in series with a set point potentiometer or variable resistor 46 and a fixed resistor 47. A fixed resistor 48 may be also disposed in parallel with the second leg of the bridge circuit. The third and fourth legs of the bridge circuit may simply comprise the portion of secondary winding of power transformer 41 rising between centertap conductor 52 and terminal conductors 50 and 51 respectively.

Position feedback potentiometer 53 has a slider or arm which is suitably connected by mechanical means, not shown, to sense the position of inlet guide vanes 27 of compressor 11. Potentiometer 45 provides negative feedback of information relating to the instantaneous capacity of the refrigeration system to the bridge circuit to provide a porportional band or throttling range. It will be appreciated that the position of guide vanes 27 determines the instantaneous capacity of the refrigeration system and, consequently, the position of slider 53 is related to this function. As previously described, this negative feedback of information, resulting in the proportional band or throttling range, improves the stability of the refrigeration system by inhibiting overshooting and hunting. This desirable result is achieved by varying the ratio of the resistance of potentiometer 45 which lies in the first and second legs of the bridge circuit described, and results in a temperature droop being introduced into the control characteristic of the refrigeration system, as will subsequently be described.

Temperature sensors 42 and 43 are desirably incorporated into probes 60 and 61 respectively which are inserted in the leaving and entering chilled water lines 24 and 23 respectively. While probes 60 and 61 may contain other resistance elements for purposes of trimming and providing the desired control characteristics to the system, they may be essentially thought of as principally comprising temperature sensitive resistance elements of a type generally referred to as thermistors. In the circuit shown, both thermistors 42 and 43 would desirably have either a positive or a negative temperature coefficient of resistivity and it is preferred that both thermistors 42 and 43 be of the negative temperature coefficient type. Such temperature sensors are commercially available and may be suitably embedded in probes which are inserted in the entering and leaving chilled water lines in order to place the temperature sensitive resistance elements in heat transfer with the entering and leaving chilled water.

Variable resistor or potentiometer 46 may be positioned to provide a desired equilibrium temperature for the refrigeration system. Assuming the refrigeration system has reached the desired equilibrium temperature, the resistances of resistance elements 42 and 43 and the position of potentiometer 45 will be such that the bridge circuit is balanced and no signal output from the bridge circuit is provided between arm 53 and conductor 52 connected to the centertap of power transformer 41.

Should either the entering or leaving chilled water temperature rise, indicating an increase in refrigeration load, or insufficient compressor capacity, the resistance of the leg of the bridge circuit containing resistance elements 42 and 43 will drop, therefore unbalancing the bridge circuit and causing a voltage output to appear at arm 53 with respect to conductor 52. The voltage output of the bridge circuit will have a phase relationship with respect to conductor 52 which is dependent upon the direction of the unbalance. For the example given, as the chilled water temperature rises, the resistance of sensors 42 and 43 will drop and a voltage output will be produced having the same phase as that of the voltage carried by conductor 50. If, on the other hand, the temperature of the chilled water begins to drop indicating a reduced refrigeration load, a voltage output from the bridge circuit will result having a phase similar to that carried by conductor 51.

The output voltage of the bridge circuit between arm 53 and conductor 52 is supplied to a phase discriminator circuit 55. Phase discriminator circuit 55 may be of any suitable conventional type, such as that having a dual output dependent upon the phase of the input voltage.

The output of phase discriminator 55 is supplied to a motor controller 56 which in turn controls the direction of rotation of motor 30 depending upon the phase of the voltage supplied to phase discriminator 55. In the example given, motor controller 56 will cause motor 30 to rotate in a direction to open vanes 27 to admit more refrigerant to compressor 11, thereby increasing the capacity of the refrigeration system, which will cause the bridge circuit to again become balanced.

As previously explained, the position of arm 53 of position feedback potentiometer 45 is dependent upon the position angle of vanes 27 and is arranged to supply negative feedback of information to the control circuit. In the circuit shown, as vanes 27 are opened, arm 53 will move downwardly as shown in the drawing to increase the fraction of the resistance of potentiometer 45 which lies in the first leg of the bridge circuit which contains the temperature sensitive resistance elements. This will cause the bridge circuit to balance out at a compressor capacity and a new temperature slightly higher than the temperature at which the bridge circuit previously balanced. It will be appreciated that this temperature rise with increased capacity corresponds to a temperature droop at decreased capacity. However, because temperature sensitive resistance element 43 is in parallel with this leg of the bridge circuit, its resistance will tend to approach a lower value at the new temperature which will tend to reset the balance point of the bridge circuit back to a lower temperature (such as the original temperature) to compensate for the temperature rise introduced into the proportional band type control circuit by feedback potentiometer 45.

It will be seen, therefore, that by proper adjustment of the resistance values and temperature characteristics of temperature sensitive resistance elements 42 and 43, the reset-like function introduced by probe 61 containing temperature sensitive resistance element 43 may be made to provide any desired control characteristic irrespective of the temperature droop resulting from the proportional band or throttling range characteristic provided by position feedback potentiometer 45. Thus, the leaving chilled water temperature from cooler 22 may be made to remain relatively constant irrespective of the load imposed on the system, of if desired, may even be made to rise with decreased load without sacrificing the additional stability which is provided by the negative feedback introduced into the circuit by position feedback potentiometer 45.

It will be apparent, therefore, that by use of a temperature sensor on both entering and leaving chilled water as taught by this invention, a control characteristic may be provided for a refrigeration system which is stable and, at the same time, one which need not be limited by the temperature droop normally associated with stable control systems employing only a single temperature sensor. In effect, the control information derived from the two sensors is combined in such a manner that the temperature droop affects only the combined characteristic of the temperature sensors rather than requiring a temperature droop in the leaving chilled water line.

Referring now more particularly to FIGURE 2, there is shown an alternate means of combining the control information derived from the two temperature sensors. In this embodiment of the invention, a power transformer 70 having a primary winding 71 connected to a suitable source of power is provided with a secondary winding 72 which supplies alternating current to a bridge circuit. The bridge circuit comprises a first leg containing a temperature sensitive resistance element 75 inserted in the entering chilled water line of a refrigeration machine and a temperature sensitive resistance element 76 inserted in the leaving chilled water line of the refrigeration machine which may be similar to that described in the previous embodiment of this invention. A variable resistor 77 is provided in a second leg of the bridge circuit to set the desired temperature for the refrigeration system. A third leg of the bridge circuit comprises a fixed resistor 73 and a fourth leg of the bridge circuit comprises a fixed resistor 74. A position feedback potentiometer 78 having a slider or arm 79, similar to position feedback potentiometer 45 previously described, is provided to supply negative feedback of control information to stabilize the control system. The output of the bridge circuit is supplied through conductors 83 and 84 to a phase discriminator 80 and a vane motor controller 81 to control the position of inlet guide vanes 82 of the refrigeration system.

In this embodiment, it will be seen that the resistances of temperature sensitive resistance elements 75 and 76 are in series with each other and their effect is therefore additive. In this example, the bridge circuit responds to a function of the mean temperature of the entering and leaving chilled water rather than merely responding to leaving chilled water, as is conventional prior art practice. Consequently, the proportional band or throttling range provided by position feedback potentiometer 78 results in a temperature droop which affects the mean temperature of the refrigeration system, but, as in the case of the previously described example, the temperature of the leaving chilled water need not drop in order to provide stability to the system.

This effect is illustrated in FIGURE 3, wherein the control characteristic of the system is shown by plotting temperature against refrigeration capacity. Line 65 is a plot of chilled water temperature entering the cooler, and line 66 is a plot of the temperature of chilled water leaving the cooler. Line 67 shows a plot of a function derived by the relation of the temperature sensors in the control circuit and may conventionally be referred to, for example, as a plot of mean temperature of entering and leaving chilled water. The proportional band or throttling range introduced by the position feedback potentiometer is represented by the difference in temperature between line 66 and line 67. As will be seen, line 67 has an appreciable temperature drop as is characteristic of systems employing a proportional band control. On the other hand, line 66, representing leaving chilled water temperature, does not have this characteristic droop and is maintained at a relatively constant value.

It will be readily appreciated, therefore, that the use of two temperature sensors combined into the control circuit in the manner described is capable of providing a proportional band or throttling range with its inherent stability advantages, while at the same time any desired control characteristic can be provided for leaving chilled water. The restriction of a temperature droop in the leaving chilled water characteristic is obviated by the practice of the instant invention. It will also be apparent that leaving chilled water may have a rising characteristic, if desired, or may have a characteristic which is tailored to the desired function of the system by properly selecting the component values of the control circuit in order to combine the information derived from the two temperature sensors in a manner to provide a function which results in the desired characteristic.

It will be understood that it is not necessary that the function which is derived from the two temperature sensors be eiher a reset type function or a mean temperature function, as illustrated in the two preferred embodiments thereof. Also, the combined temperature characteristic might be a fraction of mean temperature in order to provide any desired slope to the combined function represented by line 67, which may be desired, to achieve a suitable control characteristic. Likewise, it is not necessary to use a bridge type of control circuit in order to combine these functions, nor is a control system of this type limited to a centrifugal refrigeration system, but it may be applied to other types of refrigeration systems as well.

The particular control characteristic which is selected may depend upon a number of factors. It will be readily apparent, for example, that the power input to the compressor may be lessened by the selection of a rising temperature characteristic in the leaving chilled water with reduced capacity and, in some instances, this may be desired for reasons of economy. Furthermore, the control characteristic can be selected so as to maintain the compressor conditions at low loads away from the region where surge is likely to occur, thus permitting a wider range of control without danger of the compressor going into surge. Furthermore, a control system of the type herein described may be partially or entirely of the pneumatic type rather than being of an electrical type, as shown.

The essential characteristic of this invention is the derivation of a new temperature characteristic by combining the control information obtained from both leaving and entering chilled water and applying this derived function to a control system employing a proportional band for stability to obviate the temperature droop restriction imposed by utilizing merely a single temperature sensor in the control system.

Accordingly, other embodiments of this invention within the scope of the following claims will occur to those skilled in the art.

I claim:
1. A refrigeration system comprising:
 (A) a cooler for chilling a fluid medium, said cooler having an inlet for fluid medium to be chilled and an outlet for chilled fluid medium;
 (B) a compressor connected with said cooler to provide refrigeration to chill a fluid medium in said cooler;
 (C) refrigerant flow control means for controlling the refrigeration capacity of said refrigeration system by varying refrigerant flow through said system;
 (D) a control circuit for varying the refrigeration capacity of said system, said control circuit comprising:
  (1) a first sensor disposed to sense the temperature of chilled fluid leaving said cooler,
  (2) a second sensor disposed to sense the temperature of fluid entering said cooler for chilling therein,
  (3) a third sensor disposed to sense the position of said refrigerant flow control means, and
  (4) circuit means combining the sum of a function of said first sensor and said second sensor with a negative feedback function of said third sensor to provide a stable proportional band type control having a desired stable operating characteristic; and
 (E) means for adjusting the position of said refrigerant flow control means in response to the combined signal output of said control circuit to control the capacity of said refrigeration system.

2. A centrifugal refrigeration system comprising:
 (A) a cooler for chilling a fluid medium, said cooler having an inlet for fluid medium to be chilled and an outlet for chilled fluid medium;
 (B) a centrifugal compressor connected with said cooler to provide refrigeration to chill said fluid medium in said cooler, said centrifugal compressor having adjustable inlet guide vanes for controlling the refrigeration capacity of said refrigeration system by varying refrigerant flow through said compressor;
 (C) a control circuit for varying the refrigeration capacity of said system, said control circuit comprising:
  (1) a first sensor disposed to sense the temperature of chilled fluid leaving said cooler,
  (2) a second sensor disposed to sense the temperature of fluid to be chilled entering said cooler,
  (3) a third sensor disposed to sense the position of the inlet guide vanes of said compressor, and
  (4) circuit means combining the sum of a function of said first sensor and said second sensor with a negative feedback function of said third sensor to provide a stable proportional band type control having a throttling range and also exhibiting a desired operating temperature characteristic; and
 (D) vane angle positioning means for adjusting the angle of said inlet guide vanes in response to the combined signal output of said control circuit to vary the capacity of said refrigeration system.

References Cited by the Examiner

UNITED STATES PATENTS

| | | | |
|---|---|---|---|
| 2,524,913 | 10/1950 | Lathrop | 62—210 X |
| 2,780,414 | 2/1957 | De Heer | 236—15 |
| 2,817,213 | 12/1957 | Miner | 62—208 |
| 2,888,809 | 6/1959 | Rachfal | 62—208 X |
| 3,005,318 | 10/1961 | Miner | 62—141 |
| 3,122,002 | 2/1964 | Miner et al. | 62—141 |

ROBERT A. O'LEARY, *Primary Examiner.*

LLOYD L. KING, *Examiner.*